United States Patent [19]
Eckhardt

[11] 3,795,150
[45] Mar. 5, 1974

[54] SYSTEM FOR RAPIDLY POSITIONING GIMBALED OBJECTS

[75] Inventor: Homer D. Eckhardt, Lincoln, Mass.

[73] Assignee: The United States of America as represened by the Air Force, Washington, D.C.

[22] Filed: Dec. 13, 1972

[21] Appl. No.: 314,622

[52] U.S. Cl. .............................. 74/5.4, 244/1 SA
[51] Int. Cl. ........................................ G01c 19/00
[58] Field of Search .. 74/5.4, 5.45, 5.47, 5.42, 5.22, 74/5.41; 244/1 SA; 102/DIG. 3

[56] References Cited
UNITED STATES PATENTS

| | | | |
|---|---|---|---|
| 2,801,544 | 8/1957 | Wagner | 102/DIG. 3 |
| 2,893,248 | 7/1959 | Ecary | 102/DIG. 3 |
| 2,592,417 | 4/1952 | Hale | 102/DIG. 3 |

Primary Examiner—Manuel A. Antonakas

[57] ABSTRACT

A system for rapidly positioning gimbaled objects utilizing a rotating mass stabilization technique in conjunction with a brake and motor at each gimbal trunnion. With the alternate activation and energizing of a preselected motor and brake, the gimbaled object can be rapidly positioned with a minimum of torque.

7 Claims, 1 Drawing Figure 3,795,150
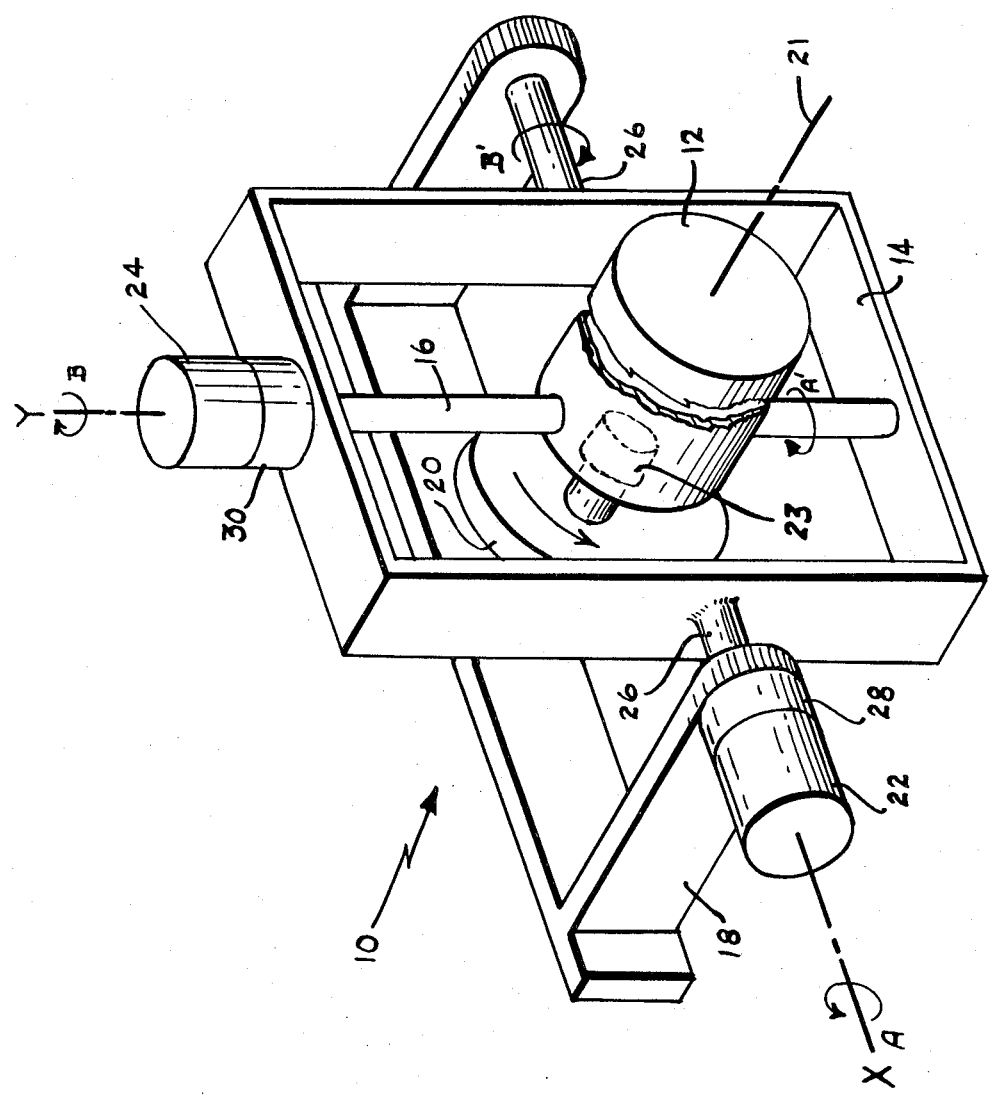

SYSTEM FOR RAPIDLY POSITIONING GIMBALED OBJECTS

BACKGROUND OF THE INVENTION

This invention relates generally to a system for applying positioning torque to a gimbaled object and, more particularly, to a system which requires only modest torque for rapidly positioning a gimbaled object such as a stabilized platform.

There exists in numerous fields a need for accurately stabilized platforms. Such a stable platform is used to maintain angular reference directions in inertial space. The most effective application of a stable platform is made by inertial navigation systems which depend upon the platform for fixity to an extreme degree. In principle, a platform drift of one degree of arc can lead to a navigating error of 60 nautical miles. Furthermore, these platforms not only find use in navigational systems, but they also find application in any area wherein an object or instrument such as telescopes or radar must be stabilized.

The platform itself and any object mounted thereon usually has at least two degrees of freedom. This platform is preferably rotatably supported by a frame through the use of a first set of trunnions or supporting shafts with the frame in turn supported by a second set of trunnions which are orthogonal to the first set. In such a system, additional means are provided for rapidly positioning the platform and for maintaining its stable position. Generally, such a stabilized platform is mechanized by using two or more gyroscopes to sense rotation of the platform from the desired orientation and driving means to torque the platform in order to resist this rotation. Such an arrangement, however, is complex in nature, extremely expensive in construction and still requires large amounts of torque produced by large torquing motors if it is so desired to rapidly position the platform and any objects thereon.

In order to alleviate some of the problems set forth hereinabove it is possible to stabilize a platform by mounting a rapidly spinning mass in bearings which are rigidly attached to the platform. Such a spinning mass will tend to spatially stabilize any line on the platform which is parallel to the axis about which the mass is spinning. This system eliminates the use of stabilizing gyroscopes and is therefore potentially simpler and cheaper than the use of gyroscopes acting in servoloops and therefore desirable in platform systems which do not require three degree of freedom stabilization. The spinning mass system, however, requires large angular momentum of the spinning mass for good stabilization of the platform. Therefore, extremely large torques must be applied about the gimbal axis to produce any rapid angular motion of the platform about any axes other than one parallel to the axis of spin of the spinning mass. Although small angular changes can be performed relatively easily with the spinning mass technique, the large torque requirement has prevented the application of a spinning mass stabilization technique from becoming acceptable in systems where rapid repositioning is needed. Any further modifications of this system merely increase the complexity of construction and operation and therefore produce many of the problems encountered with other prior art stabilization and repositioning techniques. It is therefore clearly evident that a major problem arises in the field of spin stabilized gimbaled objects when it becomes necessary to rapidly position such an object for whatever reason.

SUMMARY OF THE INVENTION

The instant invention sets forth a system which is capable of rapidly positioning gimbaled objects utilizing the spinning mass technique with a minimum of torquing power. In this invention each of the gimbal trunnions of a spinning mass stabilized platform is provided with a brake or any other suitable actuatable friction, locking or restraining device in conjunction with a torque motor. This combination allows for the use of an extremely small torque motor, contrary to the large torquing requirements of the past. In order to rotate the platform rapidly to a new orientation with the instant invention, the brake or friction device is applied to one gimbal axis while the torque motor on the other axis is activated to produce a platform rotation about this second axis until the desired rotation of the platform has been achieved. When the desired rotation about this second gimbal axis has been attained the brake on the first gimbal axis is released, the torque motor on the second axis is deactivated, and the platform rotation stops. The process is then repeated with the brake on the second axis activated and the torque motor on the first axis activated to produce the desired rotation about the first axis.

The motor torque required with the system of this invention is very modest even for large rotation rates of the spinning mass because the brake or friction device has reduced the stabilized platform to the status of a single degree of freedom gyroscope. Thus, the desired platform orientation has been achieved very rapidly and any subsequent minor positioning control can be accomplished by merely activating the motors without energizing the braking means.

It is therefore an object of this invention to provide a system for rapidly positioning spin stabilized gimbaled objects with the utilization of small torquing power.

It is another object of this invention to provide a system for rapidly positioning gimbaled objects which is economical to produce and which utilizes conventional, currently available components that lend themselves to standard mass producing techniques.

For a better understanding of the present invention together with other and further objects thereof reference is made to the following description taken in connection with the accompanying drawing and its scope will be pointed out in the appended claims.

DESCRIPTION OF THE DRAWING

The only FIGURE of this drawing is a pictorial view of the system of this invention for rapidly positioning gimbaled objects.

DETAILED DESCRIPTION OF THE PREFERRED EMBODIMENT

Reference is now made to the only FIGURE of the drawing which shows in pictorial fashion the system 10 of this invention which is utilized to rapidly position any gimbaled object such as a stable platform 12. This platform 12 may take on any desired configuration, it may be in the form of a telescope, radar or the like or it may contain any suitable instruments either within or thereupon. Platform 12 is a spin stabilized platform and is mounted on gimbals such as frame 14 and shaft 16.

This arrangement allows platform 12 to have two degrees of rotational freedom relative to mounting base 18. A rotating mass 20 of any suitable configuration is rotatably secured along the axis 21 of platform 12 and its rapid spinning produced by any suitable motor 23 about axis 21 tends to hold platform 12 such that axis 21 remains at a steady inertial orientation.

Any suitable torquing motors 22 and 24 are mounted upon base 18 and frame 14 respectively. Motor 22 is operably connected in any conventional manner to shaft 26 of frame 14 while motor 24 is operably connected in any conventional manner to shaft 16, the operation of which will be described hereinbelow.

Under ordinary circumstances with platform 12 stabilized by the rotation of mass 20, activation of motor 22 tending to rotate shaft 26 in the direction of arrow A causes the rotation of platform 12 about the Y axis in the direction of arrow $A^1$. Likewise, an activation of motor 24 tending to rotate shaft 16 in the direction of arrow B causes rotation of platform 12 in the direction of arrow $B^1$ about the X axis. This type of arrangement performs adequately for any slow minor positional change of platform 12. However, because of the large angular momentum required of spinning mass 20 necessary for good stabilization of platform 12, extremely large torques must be applied about the gimbal axes X and Y to produce rapid angular motion of the stabilized platform 12. This large torque requirement is virtually prohibitive when a gimbaled object is to be rapidly repositioned.

The instant invention utilizes a brake or other actuable friction or restraining devices 28 and 30 in conjunction with motors 22 and 24, respectively. With the system set forth in this invention, rapid rotation of platform 12 to any desired orientation can be easily accomplished with minimum power from motors 24 and 22, respectively, when brakes or friction devices 28 and 30 are alternately energized and de-energized in a manner to be set forth hereinbelow.

For example, when one wishes to rapidly change the angular position of platform 12 about the Y axis it is merely necessary to energize braking means 28 locking frame 14 in place and apply only a modest torque from motor 24 so as to rotate platform 12 about the Y axis. If it is further desired to rotate platform 12 about the X axis one must merely apply the brake 30 to lock shaft 16 and platform 12 and apply a modest torque from motor 22 so as to accomplish rotation about the X axis. In both instances platform 12 will rotate in the same direction as the torque applied by either motor 22 or 24. When the desired gimbal angle has been obtained it is merely necessary to de-energize the appropriate brake 28 or 30 the appropriate torque motor 24 or 22 and the rotation of platform 12 will stop and stabilize. Any further minor slow repositioning can be accomplished without the energizing of brakes 28 and 30 by torque motors 22 and 24 by the conventional manner set forth hereinabove.

It is therefore clearly evident that system 10 of this invention which incorporates therein a plurality of brakes 28 and 30 as well as the spinning mass stabilization technique is inexpensive in construction, simple in operation.

Although this invention has been described with reference to a particular embodiment it will be understood to those skilled in the art that this invention is also capable of a variety of alternate embodiments within the spirit and scope of the appended claims.

I claim:

1. In a system for rapidly positioning gimbaled objects having a mounting base, first means rotatably mounted on said base for supporting said object for rotation about a first axis, second means rotatably mounted on said first means for supporting said object for rotation about a second axis, first driving means for rotating said first supporting means about said first axis and second driving means for rotating said second supporting means about said second axis wherein the improvement therein comprises a mass rotatably mounted along an axis of said gimbaled object, means for spinning said mass, a first retarding means operably connected to said first driving means for preventing rotation of said first supporting means with respect to said base, and second retarding means for preventing rotation of said second supporting means with respect to said first supporting means, whereby energizing of said first retarding means and simultaneous activation of said second driving means causes rapid positioning of said gimbaled object about said second axis while energizing of said second retarding means and simultaneous activation of said first driving means causes rapid positioning of said gimbaled object about said first axis.

2. In a system for rapidly positioning gimbaled objects as defined in claim 1 wherein said first and second retarding means are in the form of brakes.

3. In a system for rapidly positioning gimbaled objects as defined in claim 2 wherein said gimbaled object is a stabilized platform.

4. In asystem for rapidly positioning gimbaled objects as defined in claim 3 wherein said first supporting means is a frame having a shaft for rotatably securing said frame to said base.

5. In a system for rapidly positioning gimbaled objects as defined in claim 4 wherein said second supporting means is a shaft rotatably secured within said frame and said platform is mounted on said shaft for rotation therewith.

6. A method of rapidly positioning a gimbaled object comprising the steps of stabilizing said object by rotating a mass secured thereto, preventing rotation of said gimbaled object about a first axis and applying a relatively small torque to said gimbaled object about a second axis thereby causing said gimbaled object to rapidly rotate about said second axis.

7. A method of rapidly positioning a gimbaled object as defined in claim 6 further comprising the steps of preventing rotation of said gimbaled object about said second axis and applying a relatively small torque to said gimbaled object about said first axis thereby causing said gimbaled object to rapidly rotate about said first axis.

* * * * *